Patented Jan. 27, 1925.

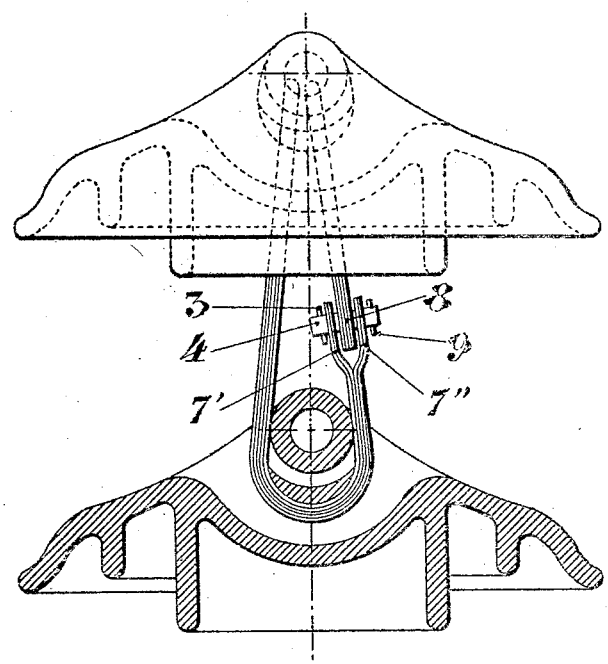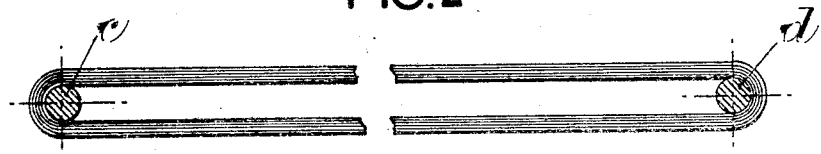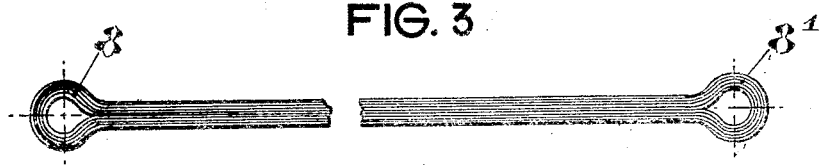

1,524,408

UNITED STATES PATENT OFFICE.

ALFRED RENAUDIN, OF LYON, FRANCE.

LIGATURE FOR CONNECTING INSULATING ELEMENTS FOR SUSPENDED HIGH-TENSION WIRES.

Original application filed February 26, 1921, Serial No. 448,115. Divided and this application filed July 25, 1922. Serial No. 577,426.

(GRANTED UNDER THE PROVISIONS OF THE ACT OF MARCH 3, 1921, 41 STAT. L., 1313.)

*To all whom it may concern:*

Be it known that I, ALFRED RENAUDIN, a citizen of the French Republic, of Lyon, France, have invented certain new and useful Improvements in Ligatures for Connecting Insulating Elements for Suspended High-Tension Wires, for which I have filed an application in France, No. 527,137, February 23d, 1920, of which the following is a specification.

This invention relates to improvements in ligatures for connecting insulating elements for suspended high tension wires and is a division of application 448,115 filed Feb. 26, 1921.

In suspended high tension electric wires the insulating elements are connected to one another to form vertical or horizontal chains by wire links or ligatures.

The improved ligature of the present invention is constructed in a definite manner.

In the annexed drawings:—

Fig. 1 shows two insulating elements connected by the ligature.

Figs. 2 and 3 illustrate the method of constructing the ligature. The ligature is formed by placing at a distance equal to the length of the ligature two round rods $c$ and $d$ around which a continuous wire is wound, one extremity being porvisionally fastened. The number of strands being obtained, the two ends of the wire are connected. The ligature has then the shape shown in Fig. 2. The parallel strands are then brought together by compression and the rods $c$ and $d$ are removed. The ligature has then the shape shown in Fig. 3 that is to say the strands are parallel and juxtaposed except at the ends which form loops 8 and $8^1$. The ligature retains this shape since it is constituted by metal threads, which possesses a certain amount of rigidity.

To connect two insulating elements in series the ligature is passed through the passages in the elements. The two loops are then brought together. One of the loops is divided in two, then the two parts thus obtained $7^1$ and $7^{11}$ are separated to leave place for the other loop 8 which is engaged between them. The mechanical connection is obtained by passing through the loops a pin 4 of any shape which is maintained in place by any suitable means for instance by means of two exterior pins 3 and 9.

What I claim as my invention and desire to secure by Letters Patent of the United States is:—

A ligature for connecting insulating elements for suspended high tension wires comprising several strands constructed from a continuous metal wire and having a loop at each end, one loop being divided and the other loop inserted between the loop so divided and means extending through said loops to connect the same.

In witness whereof I have signed this specification in the presence of two witnesses.

ALFRED RENAUDIN.

Witnesses:
 JULIAN KEMBLE SMEDLEY,
 GUILLAUME PIOCHE.